United States Patent
Borkowski et al.

[11] 3,786,270
[45] Jan. 15, 1974

[54] PROPORTIONAL COUNTER RADIATION CAMERA

[75] Inventors: Casimer J. Borkowski; Manfred K. Kopp, both of Oak Ridge, Tenn.

[73] Assignee: The United States of America as represented by the United States Atomic Energy Commission, Washington, D.C.

[22] Filed: Feb. 1, 1973

[21] Appl. No.: 328,579

[52] U.S. Cl.................. 250/385, 250/374, 250/375
[51] Int. Cl. ............................................. G01t 1/18
[58] Field of Search.................. 250/374, 375, 385, 250/379

[56] References Cited
UNITED STATES PATENTS

| | | | |
|---|---|---|---|
| 3,585,003 | 6/1971 | Scolnick | 250/379 X |
| 3,601,612 | 8/1971 | Peres-Mendez | 250/385 |
| 3,603,797 | 9/1971 | Borkowski et al. | 250/379 |

*Primary Examiner*—Archie R. Borchelt
*Attorney*—Roland A. Anderson

[57] ABSTRACT

A gas-filled proportional counter camera that images photon emitting sources has been provided. A two-dimensional, position-sensitive proportional multiwire counter is provided as the detector. The counter consists of a high voltage anode screen sandwiched between orthogonally disposed planar arrays of multiple parallel strung, resistively coupled cathode wires. Two terminals from each of the cathode arrays are connected to separate timing circuitry to obtain separate X and Y coordinate signal values from pulse shape measurements to define the position of an event within the counter arrays which may be recorded by various means for data display. The counter is further provided with a linear drift field which effectively enlarges the active gas volume of the counter and constrains the recoil electrons produced from ionizing radiation entering the counter to drift perpendicularly toward the planar detection arrays. A collimator is interposed between a subject to be imaged and the counter to transmit only the radiation from the subject which has a perpendicular trajectory with respect to the planar cathode arrays of the detector.

7 Claims, 6 Drawing Figures

PROPORTIONAL COUNTER RADIATION CAMERA

REFERENCED PATENTS

U.S. Pat. No. 3,603,797, issued Sept. 7, 1971, for a "Two Dimensional Position-Sensitive Radiation Detector" having a common assignee with the present invention.

BACKGROUND OF THE INVENTION

The present invention was made during the course of, or under, a contract with the United States Atomic Energy Commission.

This invention relates generally to two-dimensional radiation detectors of the gas-filled proportional counter type and more specifically to an ionizing radiation camera with a gas-filled position-sensitive proportional multiwire counter as the detector.

The proportional counter has several advantages over other radiation detection devices which could be used to advantage as a radiation camera. This is especially true in view of the multiwire position-sensitive proportional counter described in U. S. Pat. No. 3,603,797, referenced above. In this detector the output pulses have a particular pulse shape, or rise time, which is indicative of the position of an event detected with the multiwire array. The pulse shape and energy of individual detected events are measured to allow pulse shape and energy discrimination for background reduction. Thus, low energy photons may be imaged with greater sensitivity and selectivity than in other known radiation camera systems. The electronic signal processing and image storage permit image enhancement and background subtraction.

The dimensions of the sensitive area of the camera can be adapted to image large subjects. The length of the multiwire electrodes of the counter and the number or spacing of the wires are practically unlimited and the counter gas mixtures and pressures can be selected to detect a wide range of energies with adequate detection efficiency and good spatial resolution.

Since the detector readout can be connected directly to storage devices, such as a lithium storage tube with a television monitor display, the image may be viewed in real-time and/or transferred single-frame to video tape for dynamic imaging, e.g., function studies of body organs. Although the camera of this invention, as in any other known electronic imaging device, does not have the resolution of an X-ray photographic process, it does provide a practical system for fast imaging of subjects with acceptable sensitivity and spatial resolution of relatively weak radiation images which is simple to construct, relatively uncomplicated to operate and inexpensive to build and maintain. This camera has potential application in the fields of nuclear medicine, nuclear physics, and X-ray diffraction.

SUMMARY OF THE INVENTION

In view of the above, it is an object of this invention to provide an ionizing radiation imaging device employing a multiwire proportional counter detector.

Another object of this invention is to provide an ionizing radiation camera which is simple to construct, operate and maintain.

Yet another object of this invention is to provide a radiation camera as in the above objects which has a linear output that can be connected to a television type monitor for real-time display.

The camera of this invention has four main parts: collimator; gas-filled, position-sensitive proportional counter including an electrostatic drift field within the gas volume of the counter to increase radiation stopping power and increase sensitivity; signal processing system; and display or storage system. The collimator, which is interposed between the subject to be imaged and the counter may be of the type which transmits only the radiation having a perpendicular trajectory with respect to the multiwire planes of the proportional counter. The proportional counter detects a portion of the transmitted radiation and produces electrical output signals proportional to the X-Y coordinate and the entry of each event. The signal processing and display system transforms the electrical signals and reproduces the radiation image.

Other objects and many of the attendant advantages of the present invention will be obvious from the following detailed description of the invention taken in conjunction with the accompanying drawings.

DETAILED DESCRIPTION

Figure 1:
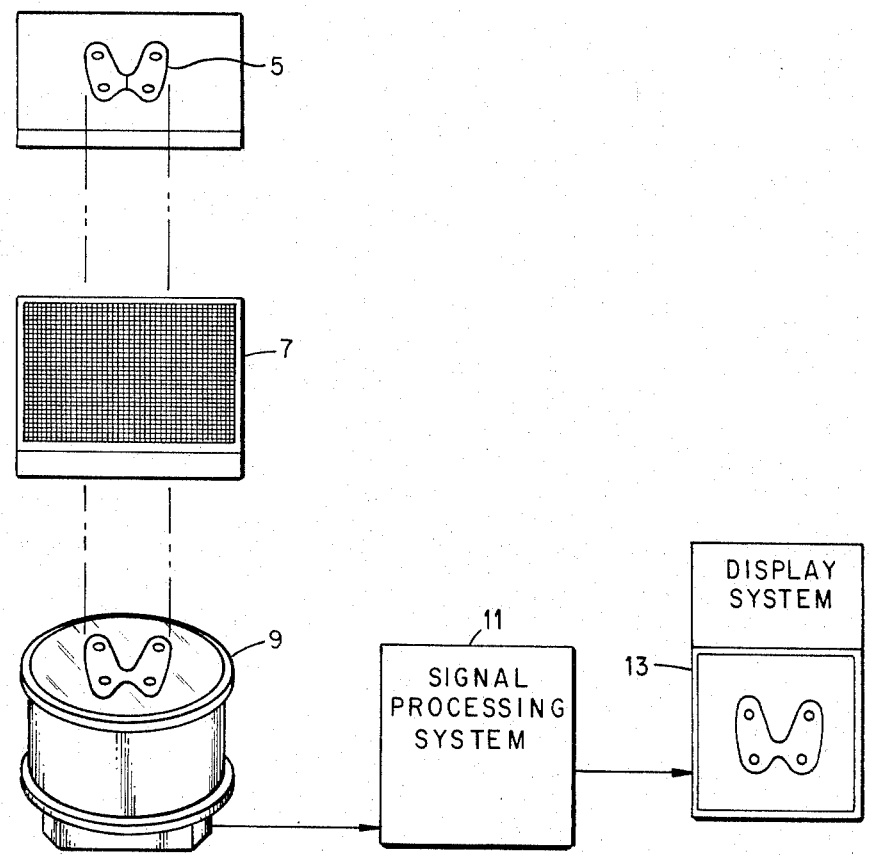
FIG. 1 is a block diagram of the basic components and signal flow of a proportional counter camera according to the present invention.

Referring now to FIG. 1, there is shown a radiation camera according to this invention illustrated for imaging a Picker thyroid phantom (subject) 5 containing a solution of $^{125}I$. A collimator 7, which may take various forms as will be described herein, is interposed between the subject 5 and a proportional counter 9. The output of the counter 9 is connected to a signal processing circuit 11 in which signals whose shapes are indicative of the X-Y coordinates and the energy of detected events are transformed into electrical signals whose amplitudes are proportional to the event positions which may be stored in a conventional X-Y recorder or displayed on a television type monitor 13. A detailed description of the various parts and alternative embodiments of the system shown in FIG. 1 will be described.

Typically, the collimator may be a channel collimator 7 which ensures the passage of only mutually parallel rays into the counter 9. The channel collimator, as shown in FIG. 1, typically has a 120 × 160-mm² open area, an ~1-mm² channel size, and a 25-mm height. The channel walls are 0.1-mm thick copper. The geometric efficiency of the collimator, i.e., the ratio of photons transmitted to photons emitted by the subject 5, is approximately $10^{-4}$. For a 100-mm spacing between the subject and the anode plane of the multiwire counter 9, the spatial resolution, i.e., the image diameter of one point of the subject 5, is 4-mm if all transmitted photons are detected at the anode plane of the counter. However, since part of the distance between the subject and the anode plane is in the counter gas volume, as will be explained hereinbelow, the effective distance between the points of photon emission and detection is reduced; and, therefore, the overall spatial resolution of the camera, when used with collimator 7, is approximately 2-mm for a subject 100-mm above the counter detection plane. In this case, the collimator limits the resolution of the camera.

Figure 2:
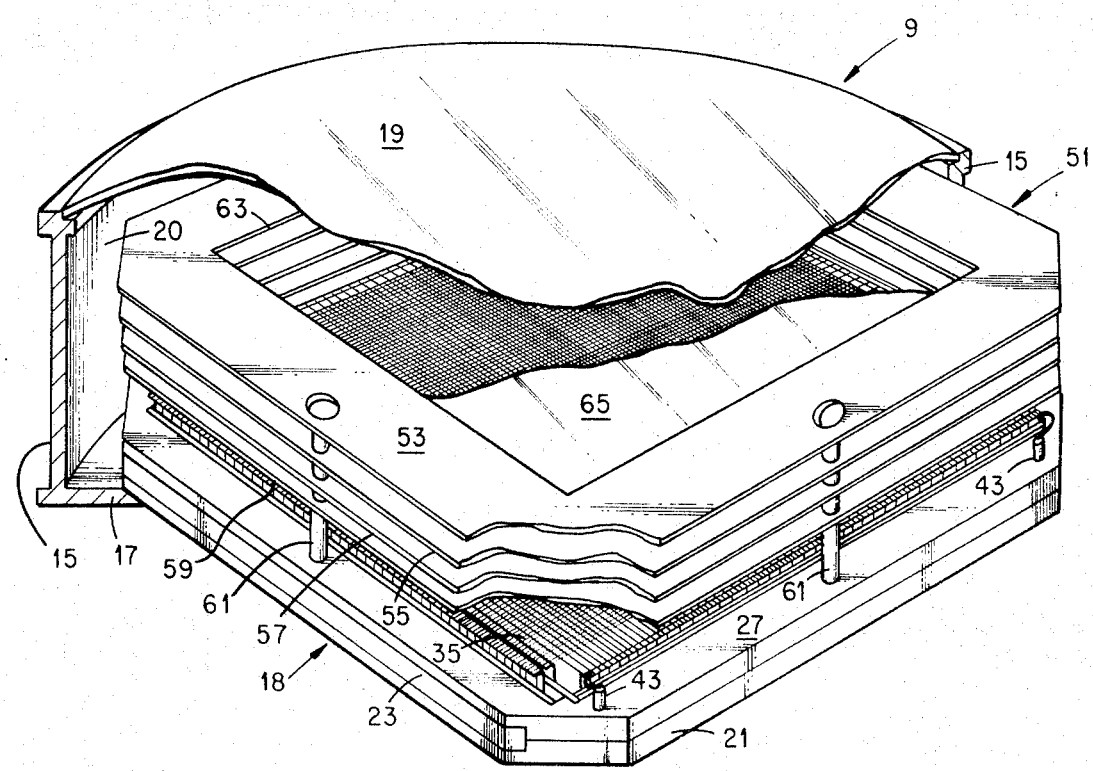
FIG. 2 is a perspective, partially sectional view of the proportional counter of FIG. 1.
Figure 3:
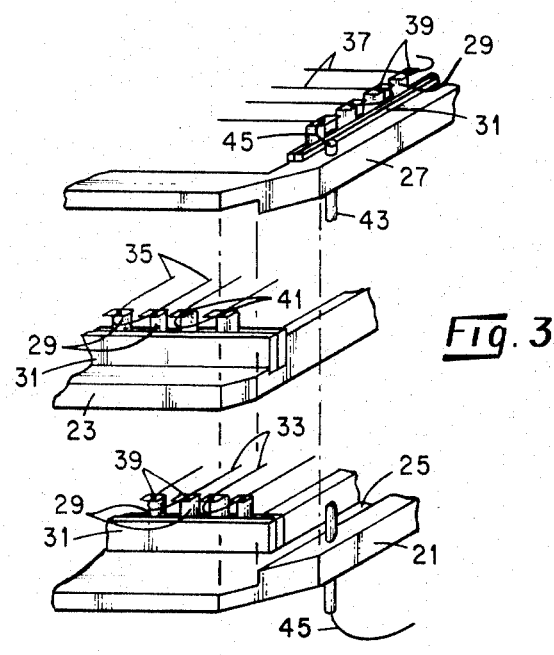
FIG. 3 is a fragmented exploded view of the multiwire electrode grid assembly shown in FIG. 2.

Referring now to FIG. 2 and FIG. 3, the proportional counter 9 is shown to include a cylindrical housing 15 which contains the counter gas. The housing illustrated here is constructed of an aluminum cylinder approximately 400-mm in diameter. The cylinder is closed at the bottom end with a 20-mm thick mounting plate 17 which supports the internal electrode arrangement 18. The other end of the cylinder 15 is closed by a radiation entrance window 19 to form a sealed counter gas envelope 20. The window 19 may be adapted so that various types of window materials may be interchanged to permit the penetration of a wide range of photon energies and to contain a wide range of counter gas pressures. Tests of the illustrated device were performed in which the gas pressure was less than 2 atm. and the window was 0.75-mm thick aluminum.

Three frames which hold the multiwire cathode and anode arrangement 18 are nested together in an assembly to form grid planes with an anode plane centered between two cathode planes. The assembly is mounted on the mounting plate 17 within the counter gas envelope 20. The bottom (cathode) multiwire electrode frame 21 is mounted directly to the mounting plate 17. As shown in detail in FIG. 3, the second (anode) electrode frame 23 is disposed within a channel 25 of frame 21 and the third (cathode) frame 27 rests on both frames 21 and 23. Each of the frames 21, 23, and 27 is provided with pretensioned mounting springs 29 which are held in the respective frames by vise blocks 31. Frame 21 carries the lower cathode grid wires 33, frame 23 carries the anode grid wires 35, and frame 27 carries the upper cathode grid wires 37 which are mounted orthogonal to the anode wires 35 and lower cathode wires 33.

The construction of the multiwire grids 33, 35 and 37 is simplified considerably by the following method. Each grid is made with a single, continuous wire strung around a set of reference pins (not shown) so that a set of approximately 100 parallel, coplanar wires is formed. The cathode wires (75-$\mu$-diameter nichrome) 33 and 37 are connected to the respective pretensioned springs 29 with low outgassing epoxy as indicated at 39 without making any electrical connection between the wires and springs 29. Similarly, the anode wires (35-$\mu$-diameter stainless steel) are soft soldered, as indicated at 41, to their respective pretensioned springs 29 thus resulting in electrical connection at their base area (not shown). The springs 29 pretensioning rig and reference pins (not shown) are removed, and the wires remain supported under tension by the springs 29. With this assembly the frame material with exception of the vise blocks 31 of the anode frame 23 does not need to be constructed of low outgassing electrical insulating material. Only one electrical connection to the anode grid 35 and two electrical connections to each cathode grid 33, 37 are required, as will be described hereinbelow.

The connections to the cathode grids are made through insulated connection posts 43 (only one illustrated in FIG. 3) which provide passage of electrical leads 45 to the cathode grids. The posts 43 extend through the mounting plate 17 and are sealed to prevent leakage of gas from the counter envelope 20.

The remainder of the counter 9 consists of an electron drift field arrangement generally indicated at 51. The drift field is incorporated in the counter 9 to provide a greater active gas volume within the sensitive area of the counter to increase the detection efficiency. A series of parallel spaced field plates or electrodes 53 through 59 are mounted above the electrode grids by means of insulating mounting posts 61 extending from the multiwire electrode grid assembly 18. Each of the plates has an equal area central opening 63 which defines the counter sensitive area. The field plates 53-59 are spaced apart equal distances and have different potentials, decreasing toward the counter grids 18, so as to produce a linear drift field region. The linear drift field causes the electrons produced by an event to drift toward the anode on a perpendicular path with respect to the grid planes 18, thus preserving the original coordinates of the entering radiation. The most negative electrode 53, which is closest to the entrance window 19 is covered with a 25-$\mu$-thick aluminum membrane 65. This membrane transmits most photons and defines the upper boundary of the drift field, therefore limiting the active counting volume of the proportional counter 9. The drift field plates are typically spaced about 12-mm apart with adjacent plates connected by resistors which decrease the voltage toward lower plate 59 with the upper plate 53 having approximately $-5000V$ applied thereto as will now be explained with reference to FIG. 4.

Figure 4:
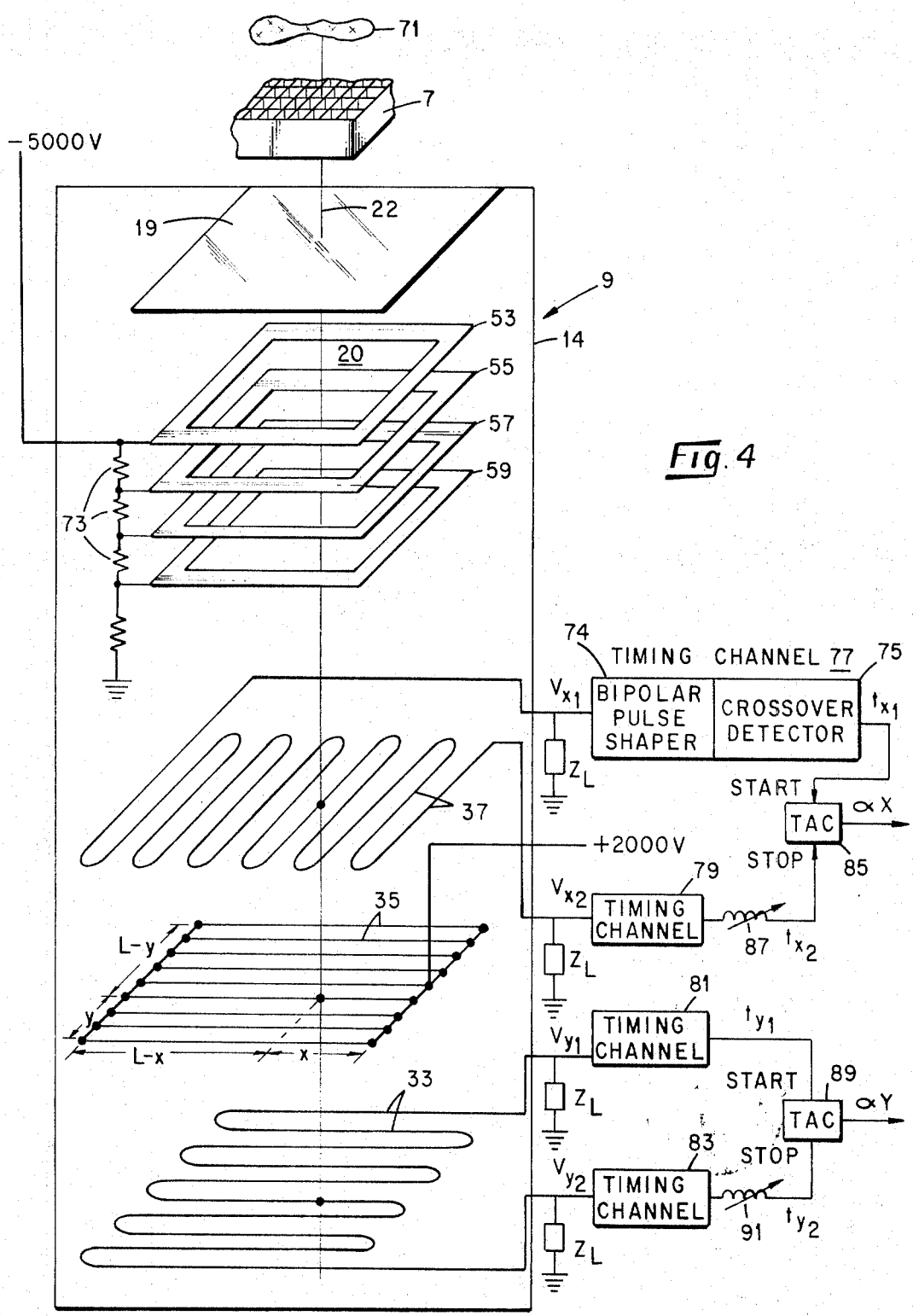
FIG. 4 is a schematic diagram of the counter of FIG. 2.

As shown in FIG. 4, an X-ray or gamma ray emitting source 71 is located in front of the detector 9. The collimator 7 is positioned between the source 71 and the detector window 19. The field plates 53, 55, 57, and 59 positioned beneath the window 19 are connected together by equal value resistors 73 with the lowest plate 59 connected to $-1000V$ potential and the upper plate 53 connected to a negative 5000V supply. The multiwire cathode grids 33 and 37 are orthogonally disposed beneath the field plate 59 with the anode grid 35 sandwiched between the cathodes 33 and 37. Each wire of the anode grid 35 is connected to a +2000V bias voltage supply. The cathode grids 33 and 37 are connected at each end to ground through a load impedance $Z_L$. Alternatively, the cathode grids may be formed of separate strung wires connected together at one end by equal value resistors (not shown) to obtain a similar electrical arrangement.

In either of the cathode arrangements the total resistance of each cathode between outputs is typically 6 K ohms, and the total capacitance between each cathode and the anode is 100 picofarads. Assuming 100 wire cathodes, each cathode can be considered as a lumped-element RC line for the signal flow with 60 ohms resistance and 1 picofarad capacitance per wire segment with respect to the anode. The RC-line termination impedances $Z_L$ are rational fraction approximations to the characteristic impedance of the cathode RC lines. In the detection process an ionizing event produces a localized electron avalanche in the vicinity of the anode wire closest to the coordinates of the entry of a detected photon. The positive ions produced in the avalanche move toward the cathode planes and induce a displacement current in each cathode which divides into two equal parts and flows through portions of the respective cathode RC lines and the respective load or termination impedances $Z_L$ to ground. Each pulse produced across the respective load impedance has a different shape dependent upon the position of the event within the cathode grids. These pulses are processed as described in applicants' U.S. Pat. No. 3,603,797, referenced above.

Briefly, the outputs of the cathodes are connected through pulse amplifiers (not shown) to the inputs of corresponding timing channel networks 77–83. Each timing channel network 77–83 is identical to channel 77 which is shown to consist of a bipolar pulse shaper 73 which shapes the input pulse from the $V_{x1}$ output of the upper cathode 37 into a bipolar pulse having a zero base voltage crossover time which varies in accordance with the rise time of the input pulse and a crossover detector 75 connected to the output of the pulse shaper 73. Typically, the bipolar pulse shaper 73 consists of an amplifier, two RC differentiators and one or more RC integrators with identical time constants. Additional discussion as to the pulse shaper circuit and operation may be had by referring to applicants' referenced patent.

The output of channel 77 is connected to the "start" input of a conventional time-to-amplitude converter (TAC) 85 and the output of channel 79 is connected to the "stop" input of TAC 85 through a variable delay generator 87. The output of TAC 85 is then a signal whose amplitude is proportional to the position of an ionizing event within the detector along the X axis as sensed by the upper collector grid 37.

The position of the event along the Y axis is detected by the orthogonally disposed lower cathode grid 33 and the signals are processed by an identical circuit as described above. The output of the timing channel 81, connected to receive the pulse $V_{y1}$, is connected to the "start" input of a TAC 89 while the output of timing channel 83, connected to receive the pulse $V_{y2}$, is connected to the "stop" input of TAC 89 through a variable delay generator 91. The output of TAC 89 is a signal whose amplitude is proportional to the position of the ionizing event along the Y axis. The outputs of TAC's 85 and 89 may be connected to various well-known X-Y recording means, such as the TV type monitor illustrated in FIG. 1.

The operation of the camera may be best illustrated by referring to FIGS. 1 and 4. As described above, a photon from a source such as the thyroid phantom 5 (FIG. 1) is imaged upon the counter window 19 by means of collimator 7. The imaged photons enter the counter 9 (FIG. 4) through the window 19 and proceed through the counter gas envelope 14 to the drift field region 20. Since the cathode and anode grids are so closely spaced, thus limiting the active gas volume and, therefore, the efficiency of the detector, compensation is provided by the drift field 20 which effectively increases the amount of counter gas in the path of the transmitted photons. This increases the probability of interaction between photons and counter gas. The drift field maintains the direction of electrons produced by an interaction along the photon entrance path perpendicular to the counter grid planes thus preserving the original coordinates of the interaction as represented by line 22 illustrating a photon path.

The potential applied to the resistor coupled field plates 53–59 is adjusted for a particular counter gas mixture and pressure to obtain the maximum drift velocity of the electrons produced in the drift field region.

The shapes of the currents in the terminating networks ($Z_L$) from the displacement currents produced in the cathodes by the localized electron avalanche produce similar voltage shapes $V_{x1}$, $V_{x2}$, $V_{y1}$ and $V_{y2}$ which are functions of the length of RC line between the points of induction, as illustrated by the cathodes intersection of line 22, and the cathode outputs. Therefore, if L is the total length of the cathode RC lines, the shapes of $V_{x1}$ and $V_{x2}$ are proportional to X and L-X, respectively; and the shapes of $V_{y1}$ and $V_{y2}$ are proportional to Y and L-Y, respectively. The various voltage pulses are converted to bipolar pulses and the zero crossover points are detected by the corresponding timing channels. Since the crossover time varies in proportion to the rise time of the voltage pulses applied to the timing channel inputs, the difference in time as measured by the TAC's 85 and 89 provides signals indicative of the X and Y coordinates, respectively, of the event detected by the counter 9. The delay generators 87 and 91 provide a crossover signal delay equal to one-half of the total crossover time variation corresponding to the total cathode length, thus assuring that for any particular event the "start" pulse always precedes the "stop" pulse, which is required for proper operation of the TAC's and gives a zero volt TAC output signal for X = 0 or Y = 0.

Additional circuitry (not shown) may be added to obtain energy information. The energy loss of a detected photon in the counter gas, proportional to the total current flow in the cathodes, can be measured in two ways: (1) by adding the four voltages $V_{x1}$, $V_{x2}$, $V_{y1}$, and $V_{y2}$ at the cathode outputs or (2) by measuring directly the total current flow to ground with a low impedance current- or charge- sensitive preamplifier and meter circuit.

Images taken by the camera may be stored and displayed by several data display and storage devices other than a two-parameter analyzer. The simplest conventional system is an oscilloscope with a photographic camera that takes time exposed pictures of the oscilloscope traces. The horizontal and vertical deflection electrodes are connected, respectively, to X and Y outputs taken at the TAC's 85 and 89, respectively. A short unblanking pulse (~1 μs) is applied to the control grid of the cathode ray tube after the deflection transients. Thus, oscilloscope traces with coordinates proportional to X and Y are displayed on the oscilloscope and integrated on the camera film. The advantages of such a system are low cost, good gray-scale capability, and continuous resolution. However, image monitoring and image processing for background subtraction or noise rejection are not practical.

A bistable storage scope was evaluated as an image monitor, connected and blanked in the same way as a standard oscilloscope. The advantage of this type of monitor is that it combines continuous resolution with real-time observation of the image. The lack of gray-scale and image processing capabilities and the long deflection transient (~90 μs for 200-mm, full-scale deflection) are disadvantages.

Another device, a lithicon storage tube with TV monitor display 13, as illustrated in FIG. 1, offers the greatest number of advantages: good gray-scale capability;

short deflection transient (10 μs full scale); 1200-TV-line resolution; contrast, intensity, and magnification control of the stored image; and choice of image display on the TV monitor or single-frame transfer to video tape for dynamic imaging, e.g., function studies of organs.

The input connections and unblanking of this lithicon system are identical to those of the first two devices; all three have been used simultaneously.

Figure 5:
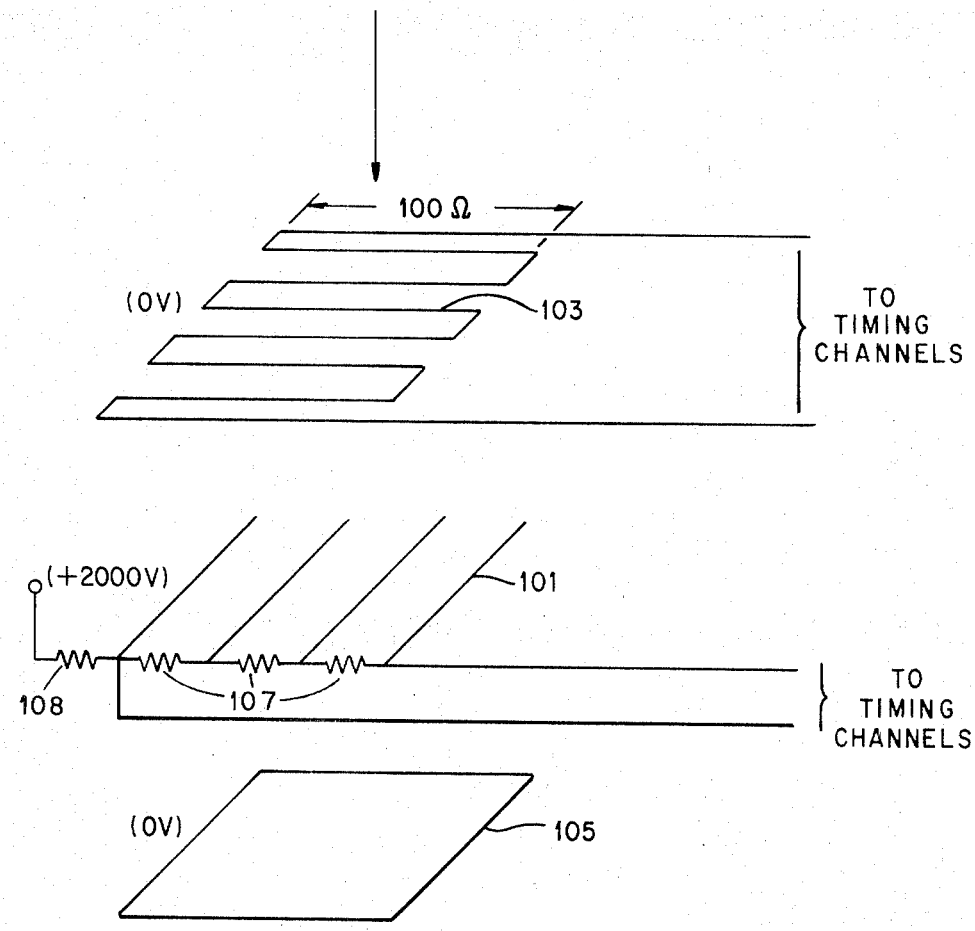
FIG. 5 is a schematic diagram of an alternate electrode grid arrangement which may be used with the counter of FIG. 2.

An alternate embodiment of the counter grid arrangement is shown in FIG. 5. An ionization electron from a linear drift field 20 (FIG. 4) is assured to be incident on the grid region as before. In this embodiment, position signals are obtained from the anode grid 101, biased at +2000V, and an upper cathode grid 103. The anode bias is provided by a +2000V supply, connected to the anode through a high resistor 108 (typically 10 megohms). The lower cathode 105 may be a solid plate or grid to aid in forming the electric field. Here the anode grid 101 is a detection electrode which may be constructed similarly to the cathode grids as discussed above or constructed in the alternative manner as mentioned above by connecting one end of each anode wire 101 to the adjacent wire end through equal value resistors 107. This embodiment simplifies the construction of the detector since only two wire grids are required, but requires additional care in the connection between electrodes and the signal processing circuits. The cathode 103 is shown as described above with reference to FIG. 4. The grids 101 and 103 are placed mutually perpendicular and the pulses are handled in the same manner as described above.

It will be understood that the continuous wire grids as illustrated by 103 and the resistor connected grids 109 are electrically equivalent by making the values of resistors 107 equal to the resistance per single wire length of the grid 103, in this case 100 ohms as illustrated in FIG. 5.

Figure 6:
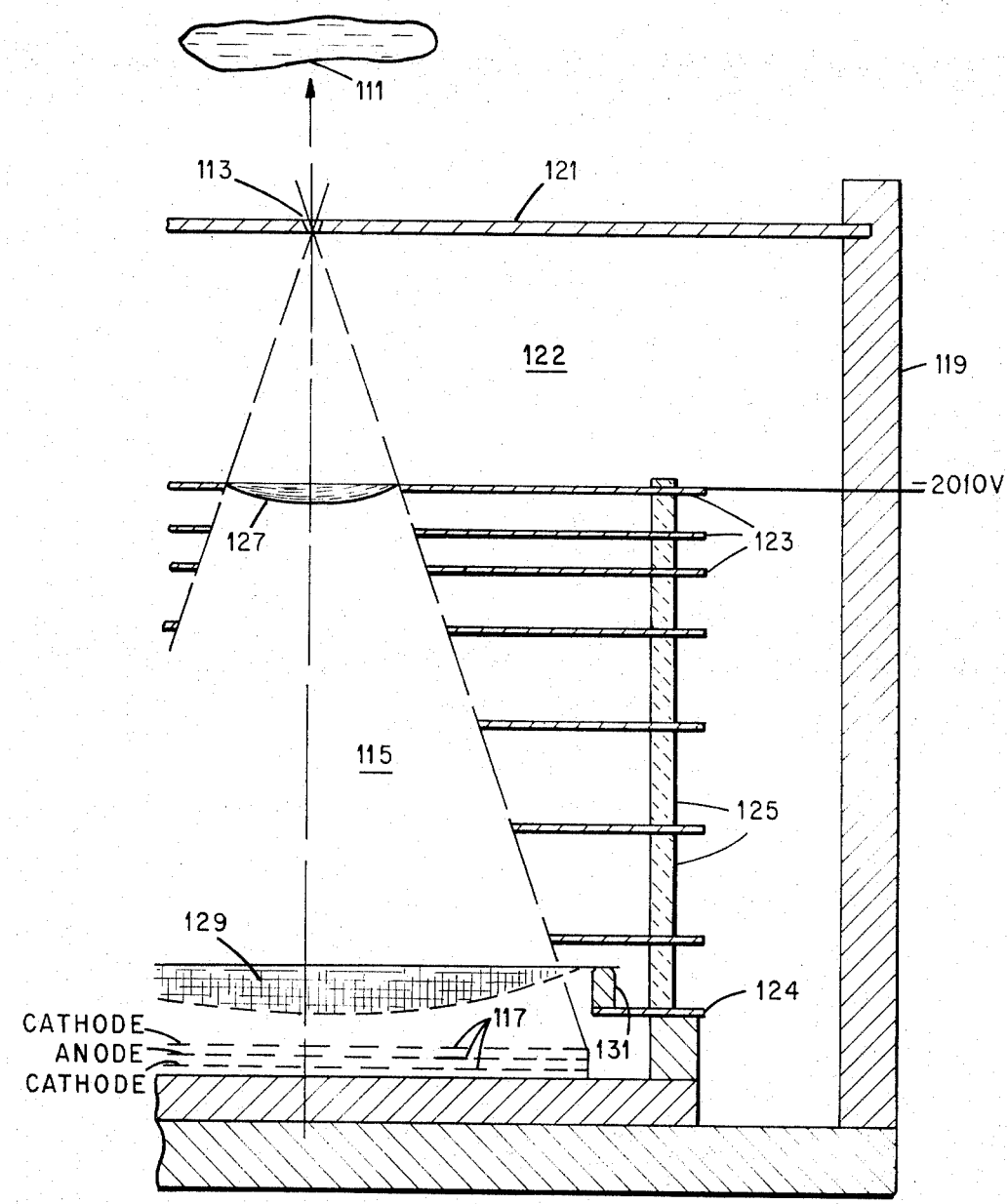
FIG. 6 is a schematic diagram of an alternate embodiment of a multiwire two-dimensional proportional counter camera according to the present invention.

Referring now to FIG. 6, an alternate embodiment of the photon camera is illustrated wherein photons from a distributed source 111 are imaged by means of a pinhole collimator 113 into an ionization region 115 prior to its detection at the grids 117 of a two-dimensional position-sensitive proportional counter as described above. The collimator 113 is a fixed aperture collimator with functions similar to the fixed aperture of a photographic pinhole camera; that is, the radiation image received at the counter grids 117 is inverted with respect to the source 111. The counter is enclosed in a housing 119 constructed of a radiation shielding material with an upper shielding plate 121 which defines the pinhole aperture 113. The radiation pinhole aperture 113 may be formed by a radiation pervious material such as beryllium to form an enclosed counter gas envelope 122 as in the previously described counter 9.

As was described above, the very small active volume of the grid 117 area requires the addition of a drift field in the region 115 to improve the counter efficiency. This camera adds a new requirement in that the radial direction of propagation of the electrons produced from photon interaction with the counter gas in the region 115 must be ensured in the drift field. This requirement is not met by a linear drift field.

A spherical drift field has been provided which is disposed within the counter envelope 122. The spherical drift field provides equipotential surfaces which are segments of concentric spheres whose centers are located at the pinhole 113. Thus, the electric field lines along which the electrons drift are radii of these spheres.

The drift field illustrated in FIG. 6 is composed of eight field-forming electrodes or plates 123. The plates 123 have circular cross section openings which increase in diameter toward the lower plate to form a frustoconical shape passage in the region 115. The plates 123 are mounted on spaced insulators 125 and are maintained at potentials which decrease toward the grids 117 by 1/R where R is the distance from the pinhole to the respective planes of each of the electrodes 123. The spacings and potentials of the electrodes 123 are adjusted so that an approximately spherical potential field is formed in region 115. The top electrode 123 is provided with a dish-shaped solid entrance membrane 127 to limit the upper drift field region. A typical voltage on the top or entrance plate 123 is −2010 volts. Resistors (not shown) connected between each of the plates 123 provide the proper potentials to the other plates until a voltage of zero is reached at the grounded lower plate 124.

A spherical segment small mesh grid 129 (typically aluminum gauze) is mounted on, but insulated from, plate 124 by means of mounting insulators 131. Grid 131 likewise has a radius equal to its distance from the pinhole 113 and connected by means of resistors to the field-forming electrodes to provide the 1/R voltage at its position in the field. The grid 131 minimizes the distortion caused by the transition between the spherical drift field and the planar counter detection grids 117.

This camera arrangement has certain advantages over the previously described embodiment. The pinhole collimator makes it possible to use high gas pressures in the enclosure. With distances suitably adjusted, a source 111 larger or smaller than the active area of the counter grid 117 may be imaged in order to more efficiently use the counter area.

Referring again to FIGS. 1, 2 and 4, the camera illustrated therein was tested in a series of imaging experiments to measure linearity and spatial resolution and to illustrate contrast and uniformity with a 2-mm wire spacing.

The linearity of the photon camera was checked with a perforated plate having 4-mm-diameter holes spaced 12-mm apart. The perforated plate covered the entire sensitive area of the camera. Images were obtained with the channel collimator 7 removed and the perforated plate placed directly on the window of the proportional counter. A point source of 22-keV X-rays from $^{109}$Cd was centered 150 cm above the window. The image was recorded on Polaroid film, with the time exposure display method described above. The integral non-linearity in both directions, X and Y, was less than 1 percent of the sensitive area.

The spatial resolution of the camera without a collimator was measured with a perforated absorber plate. The plate was directly on the window, and the source configuration was the same as in the linearity test. The perforations in the plate were one row of 4-mm-diameter holes; four rows of 2-mm-diameter holes; and four rows of 1-mm-diameter holes. The spacings between holes in each row were twice the hole diameters. The rows of smaller diameter holes (1 and 2 mm) were grouped in orthogonal sets of two parallel rows each. The displacement of these rows along their main axes was 1 mm with respect to the corresponding parallel rows.

The resolution test shows that the spatial uncertainty of the camera (without collimator) is approximately 1 mm in all directions, which is less than the anode wire spacing. Since the 1-mm displacement of the parallel rows of perforations is reproduced in the image of the absorber plate, and since the images do not show the characteristic structure of images from multiwire detectors along the anode direction, we assume that the resolution of this camera is essentially continuous. This suggests that due to the finite track length of the 22-keV photoelectrons and the subsequent diffusion of the electrons in the drift region, electron clouds are produced which extend over several anode wires, resulting in simultaneous signals on these wires. Since the camera measures the position of the centroid of the charge distribution, displacement smaller than one wire spacing in the direction across the anode wires can be detected.

The possible application of this camera in nuclear medicine is illustrated by the image of a standard Picker thyroid phantom on the TV monitor (FIG. 1). The image was produced with the channel collimator placed on the window and a 125-mm distance between the phantom and the anode. The phantom was filled with a 200-$\mu$ C solution of $^{125}$I which emits 29-keV X-rays. The intensity of the X-ray emission from the phantom was modulated by several plastic absorbers incorporated in the phantom to simulate "hot" and "cold" nodules. The left lobe and the 11-mm diameter "hot" nodule in the right lobe of the phantom had about twice the intensity of the left lobe. The diameters of the "cold" nodules, which did not emit X-rays, were 4, 8, and 11 mm. All nodules were resolved in the image, and the difference in intensity was clearly shown. Some contrast was lost by X-ray scattering in the plastic of the phantom. A total of $2 \times 10^5$ detected photons was accumulated to produce this image (including background).

The following is a brief summary of some of the operating conditions and characteristics of the photon camera.

Sensitive area: $200 \times 200$ mm$^2$.
Active counter gas volume: 3 liters.
Depth of counter gas volume: 75 mm.
Counter gas mixture: 100% CH$_4$ + 90% Ar, Kr, or Xe.
Counter gas pressure: 75–150 cm Hg.
Spatial resolution:
  a. Proportional counter: 1 mm in any direction (40,000 picture elements, tested with 22-keV photons in Kr—CH$_4$ at 150 cm Hg pressure).
  b. Collimator: ~2 mm for a 125-mm distance between subject and anode plane.
Integral non-linearity: <2 mm.
Counter detection efficiency: 65 percent for 30 keV photons in Kr—CH$_4$ at 150 cm Hg pressure.
Collimator geometric efficiency: ~10$^{-4}$.
Energy resolution (for 22-keV photons): 11 percent (fwhm) for a collimated point source, 35 percent (fwhm) for a source irradiating the entire sensitive volume of the detector.
Count rate capacity (without pile-up rejection circuits): 20,000 counts/s, limited generally by the display system.
Background count rate: 20 counts/s in Xe—CH$_4$ at 150 cm Hg pressure without additional shielding.
Position signal processing time: <5 $\mu$s/photon.
Bias (for 30-keV photons):
  Anode-Cathode: 2.1 kV in Ar—CH$_4$ at 150 cm Hg pressure; 3.5 kV in Xe—Ch$_4$ at 150 cm Hg pressure.
Drift field: 40–60 V/mm.
Electron drift velocity: ~40 mm/$\mu$s in Kr—CH$_4$ at 150 cm Hg pressure.
Position sensitivity: $207 \times 10^{-2}$ V/mm.
Time analyzer gain: $5 \times 10^6$ V/s.
Filter center frequency: $2 \times 10^6$ radians/s.
Position noise: <0.5 mm (rms).

What is claimed is:

1. An ionizing radiation camera for imaging radiation sources, comprising:

a gas-filled proportional counter envelope having a radiation pervious window therein for receiving radiation from said source;

first, second, and third closely stacked planar detection electrodes disposed within said counter envelope in spaced parallel planes, at least two of said planar electrodes comprising multiple resistively coupled parallel strung wires so as to form first and second pairs of output terminals, each pair of said output terminals taken at opposite sides of said resistively coupled multiple wire electrodes so that the shape of output pulses from the respective terminal pairs is indicative of the location of a radiation event across the corresponding multiple wire electrode, and said multiple wire electrodes being disposed orthogonally with respect to each other;

means for providing an electrostatic drift field region in the path of radiation from said source between said window and said electrodes so that electrons generated by radiation interacting with the counter gas are forced to drift along the same trajectory as the entering radiation;

a positive high voltage source connected to the central one of said stacked detection electrodes forming an anode so as to provide an electrostatic field in the area of said electrodes;

a first pulse detector means connected to said first pair of output terminals and responsive to the rise times of output pulses from said first pair of output terminals for producing an output pulse having an amplitude proportional to the position of a detected event across the corresponding multiple wire electrode connected to said first pair of terminals;

a second pulse detector means connected to said second pair of output terminals and responsive to the rise of output pulses from said second pair of output terminals for producing an output pulse having an amplitude proportional to the position of said event across the corresponding multiple wire electrode connected to said second pair of terminals; and two dimensional recording means connected to the outputs of said first and second detector means for recording the radiation image of said source.

2. The radiation camera as set forth in claim 1 further including a channel collimator disposed between said source and the window of said counter.

3. The radiation camera as set forth in claim 2 wherein said means for providing an electrostatic drift field region includes a plurality of parallel stacked electrodes and a source of negative high potential connected to said electrodes forming said drift field so as to provide a linear drift field region through an extended active gas region of said counter.

4. The radiation camera as set forth in claim 3 wherein said drift field electrodes are formed by a plurality of parallel insulatably spaced apart conductive plates each having a central aligned rectangular opening defining the sensitive detection area of said counter, a first one of said plates disposed adjacent said window having an electrically conductive radiation pervious material disposed in the rectangular opening thereof so as to limit the drift field region, said first plate being connected to said negative high voltage supply and a plurality of equal value resistors connected respectively between adjacent ones of said plates and the last one of said plates adjacent said detection electrodes and ground potential.

5. The radiation camera as set forth in claim 4 wherein said at least two of said multiple wire detection electrodes are formed of series connected equal resistance wires disposed on either side of said central one of said stacked electrodes.

6. The radiation camera as set forth in claim 1 wherein said window is of a size to form a pinhole image of said radiation source on said detection electrodes and wherein said means for providing said drift field region includes a plurality of insulatably spaced apart electrodes each having a central aligned different size opening forming a frustoconical shaped aperture projecting therethrough, a first one of said electrodes disposed adjacent said window and whose opening forms the top of said frustoconical shaped aperture, and means for applying a negative high voltage to said electrodes so as to provide a generally spherical drift field in said region, said voltages applied to said electrodes decreasing from the top to the base of said region by a factor of $1/R$, where $R$ is the distance of a plate from said window.

7. The radiation camera as set forth in claim 6 further including a spherical segment shaped grid forming one of said electrodes disposed adjacent said detection electrodes at the base of said frustoconical shaped aperture, said spherical segment grid having a radius equal to its distance from said pinhole window.

* * * * *

UNITED STATES PATENT OFFICE
CERTIFICATE OF CORRECTION

Patent No. 3,786,270  Dated January 15, 1974

Inventor(s) Casimer J. Borkowski et al.

It is certified that error appears in the above-identified patent and that said Letters Patent are hereby corrected as shown below:

Column 10, line 54, after "rise" insert --times--.

Signed and sealed this 9th day of July 1974.

(SEAL)
Attest:

McCOY M. GIBSON, JR.
Attesting Officer

C. MARSHALL DANN
Commissioner of Patents